July 9, 1963   G. N. TYSON, JR   3,097,119

EXPLOSIVE AND METHOD OF USE

Filed April 14, 1959

George N. Tyson Jr.
*INVENTOR.*

BY *Adams, Forward and MacLean*

ATTORNEYS

3,097,119
EXPLOSIVE AND METHOD OF USE

George N. Tyson, Jr., Claremont, Calif., assignor to Olin Mathieson Chemical Corporation, a corporation of Virginia
Filed Apr. 14, 1959, Ser. No. 806,399
19 Claims. (Cl. 149—22)

My invention relates to a method for the production of an explosion and to an apparatus useful in carrying out the method.

My prior application Serial No. 776,385, filed November 25, 1959, teaches that large volumes of gases useful in operating a rocket can be produced by reacting hydrazine and a boron hydride. For example, when the boron hydride used is pentaborane-9, the gases are produced substantially by the following reaction:

$$2B_5H_9 + 5H_2NNH_2 \rightarrow 10BN + 19H_2 \qquad (1)$$

My applications Serial No. 806,397 and Serial No. 806,396, filed of even date herewith, disclose that the boron hydride used can be decaborane, that borohydrocarbons such as propylpentaborane-9 and ethyldecaborane can be used as the boron hydride and that a wide variety of nitrogen-containing compounds, for example, other nitrogen hydrides and alkylhydrazines such as unsymmetrical dimethyl hydrazine, can be used in place of hydrazine.

My present invention relates in part to a method for producing explosions utilizing a boron-containing reactant and a nitrogen-containing reactant. Thus, when a boron-containing reactant and a nitrogen-containing reactant, at least one of which contains hydrogen, are reacted under conditions such that a shock wave is produced, a greatly increased amount of energy is produced, in comparison with the amount of energy produced if the reactants are reacted normally without the production of a shock wave. By a shock wave, I mean a wave in which an abrupt, finite change takes place in the pressure and velocity of the reaction products leaving the reaction zone. In fact, when the reaction is carried out under conditions such that a shock wave is produced, the increased amount of energy obtained is such as to lead me to believe that fusion of hydrogen atoms produced as a result of the reaction to form helium is taking place. This is the only explanation which I can offer for the increased amount of energy realized when the reaction is carried out under conditions such that a shock wave is produced, and hence I prefer, in practicing the method of my invention, to employ reactants the hydrogen portion of which is at last partially in the form of deuterium.

In order for the reaction to be carried out in such manner that a shock wave is produced, relatively large masses of the two reactants must be reacted at a very high rate. When the reaction is conducted this way, a large amount of hydrogen is produced almost instantly, and thus hydrogen contributes to the shock wave.

Figure 1:
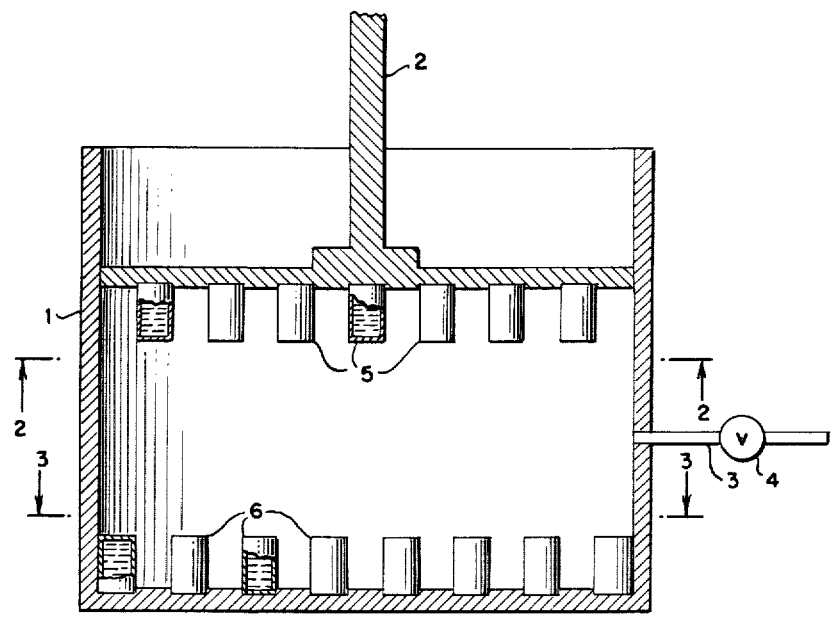
Figures 2, 3:
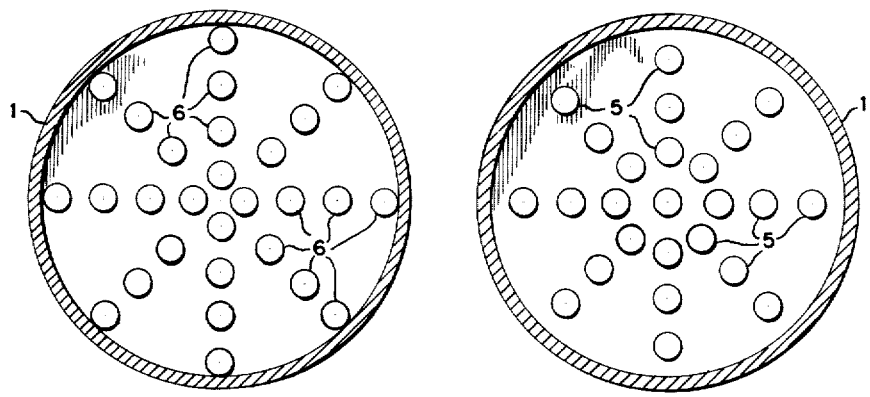

The accompanying drawing illustrates in simplified form an arrangement of apparatus in which my invention can be carried out. FIGURE 1 is a vertical section and FIGURE 2 and FIGURE 3 are sections taken along lines 2—2 and 3—3, respectively.

Example

This example illustrates the principles of the process of my invention and is to be considered in connection with the accompanying drawing.

In the drawing, the numeral 1 shows in cross-section a cylindrical container provided with piston 2 and line 3 provided with valve 4 connected to a source of vacuum. Piston 2 is held in position by a latch or trigger (not shown). The numerals 5 and 6 designate cylindrical containers which have thin walls and which are made of material which is easily broken, such as glass.

In operation, containers 5 are substantially filled with deuterated pentaborane-9 ($B_5D_9$) and containers 6 are substantially filled with deuterated hydrazine ($N_2D_4$). The amounts of pentaborane-9 and hydrazine supplied to the containers are substantially stoichiometric, as shown by Equation 1 above. For example, 126 ounces of pentaborane-9 and 160 ounces of hydrazine can be used. The free space within the container 1 is then evacuated and valve 4 is then closed.

When the latch is released, the piston smashes into the bottom of the container 1, causing containers 5 and 6 to mesh with each other and break. The result of the breaking of the containers is that a mass of pentaborane-9 is mixed with a mass of hydrazine almost instantaneously. Under these conditions the pentaborane-9 and hydrazine react with extreme violence. The reaction is so violent, in fact, that a shock wave is produced and a tremendous quantity of energy is released in the form of hot expanding gas. A large volume of gas is produced almost instantaneously as a result of the violent reaction, and this results in the production of the shock wave.

Various modifications can be made in the procedure of the specific example to provide other embodiments falling within the scope of my invention. For example, in place of the pentaborane-9, there can be used other boron hydrides, preferably deuterated boron hydrides such as $B_2H_6$, $B_2D_6$, $B_4H_{10}$, $B_4D_{10}$, $B_5H_9$, $B_5H_{11}$, $B_5D_{11}$, $B_{10}H_{14}$ and $B_{10}D_{14}$. Also, in place of the hydrazine, there can be used other nitrogen hydrides, such as $NH_3$, $ND_3$, $N_2H_4$, $H_2N$—$NH$—$NH_2$, $D_2N$—$ND$—$ND_2$ and so forth. In practicing the invention, the proportions of boron hydride and nitrogen hydride used should be approximately stoichiometric, assuming that the two hydrides react to form hydrogen gas and boron nitride (BN).

I claim:

1. A method for providing an explosion which comprises rapidly mixing a relatively large mass of a nitrogen hydride and a mass of a boron hydride in proportions approximately stoichiometric for the reaction of all of the boron in the boron hydride with all of the nitrogen in the nitrogen hydride to form boron nitride, BN, such that a mixture consisting essentially of the nitrogen hydride and the boron hydride is formed and reacts at a very high rate of reaction with the production of a shock wave.

2. The method of claim 1 wherein at least a portion of the hydrogen present in the nitrogen hydride is deuterium.

3. The method of claim 1 wherein at least a portion of the hydrogen present in the boron hydride is deuterium.

4. The method of claim 1 wherein all of the hydrogen present in the nitrogen hydride and all of the hydrogen present in the boron hydride is deuterium.

5. The method of claim 1 wherein the nitrogen hydride is hydrazine.

6. The method of claim 1 wherein the boron hydride is pentaborane-9.

7. The method of claim 1 wherein the nitrogen hydride is $N_2D_{24}$.

8. The method of claim 1 wherein the boron hydride is $B_5D_9$.

9. The method of claim 1 wherein the nitrogen hydride is $N_2D_4$, and wherein the boron hydride is $B_5D_9$.

10. An explosive device comprising a relatively large mass of nitrogen hydride and a mass of boron hydride separately positioned within container means, the proportions of nitrogen hydride and boron hydride present in the container means being approximately stoichiometric for the reaction of all of the boron in the boron hydride with all of the nitrogen in the nitrogen hydride to form boron nitride, BN, means for rapidly forming a mixture consisting essentially of the nitrogen hydride and the boron hydride and producing a very high rate of reaction, the volume of the container means at the instant of rapid mixing being substantially the same as the volume of the total of the mass of nitrogen hydride and the mass of the boron hydride.

11. The device according to claim 10 in which at least a portion of the hydrogen present in the nitrogen hydride is deuterium.

12. The device according to claim 10 in which at least a portion of the hydrogen present in the boron hydride is deuterium.

13. The device according to claim 10 in which all of the hydrogen present in the nitrogen hydride and all of the hydrogen present in the boron hydride is deuterium.

14. The device according to claim 10 in which the nitrogen hydride is hydrazine.

15. The device according to claim 10 in which the boron hydride is pentaborane-9.

16. The device according to claim 10 in which the nitrogen hydride is $N_2D_4$.

17. The device according to claim 10 in which the boron hydride is $B_5D_9$.

18. The device according to claim 10 in which the nitrogen hydride is $N_2D_4$, and wherein the boron hydride is $B_5D_9$.

19. An explosive device comprising frangible containers positioned within container means some of which frangible containers separately contain a mass of nitrogen hydride and the remainder of which contain a mass of boron hydride, the proportions of boron hydride and nitrogen hydride present in the frangible containers in the container means being approximately stoichiometric for the reaction of all of the boron in the boron hydride with all of the nitrogen in the nitrogen hydride to form boron nitride, BN, and means for smashing all of the frangible containers approximately simultaneously, the volume of the container means at the instant the frangible containers are smashed being substantially the same as the volume of the frangible containers and their contents, whereby mixing of the nitrogen hydride and boron hydride is accomplished with sufficient rapidity to form a shock wave when the frangible containers are smashed and the nitrogen hydride and the boron hydride react.

References Cited in the file of this patent

Steindler et al.: Journal of American Chemical Society, vol. 75, Feb. 5, 1953, p. 756.

UNITED STATES PATENT OFFICE
CERTIFICATE OF CORRECTION

Patent No. 3,097,119            July 9, 1963

George N. Tyson, Jr.

It is hereby certified that error appears in the above numbered patent requiring correction and that the said Letters Patent should read as corrected below.

Column 2, line 61, for "$N_2D_{24}$" read -- $N_2D_4$ --.

Signed and sealed this 25th day of February 1964.

(SEAL)
Attest:

ERNEST W. SWIDER            EDWIN L. REYNOLDS

Attesting Officer            Acting Commissioner of Patents